Feb. 27, 1945.  W. A. SHANKLIN  2,370,497
THEFT SIGNAL
Filed Nov. 14, 1942
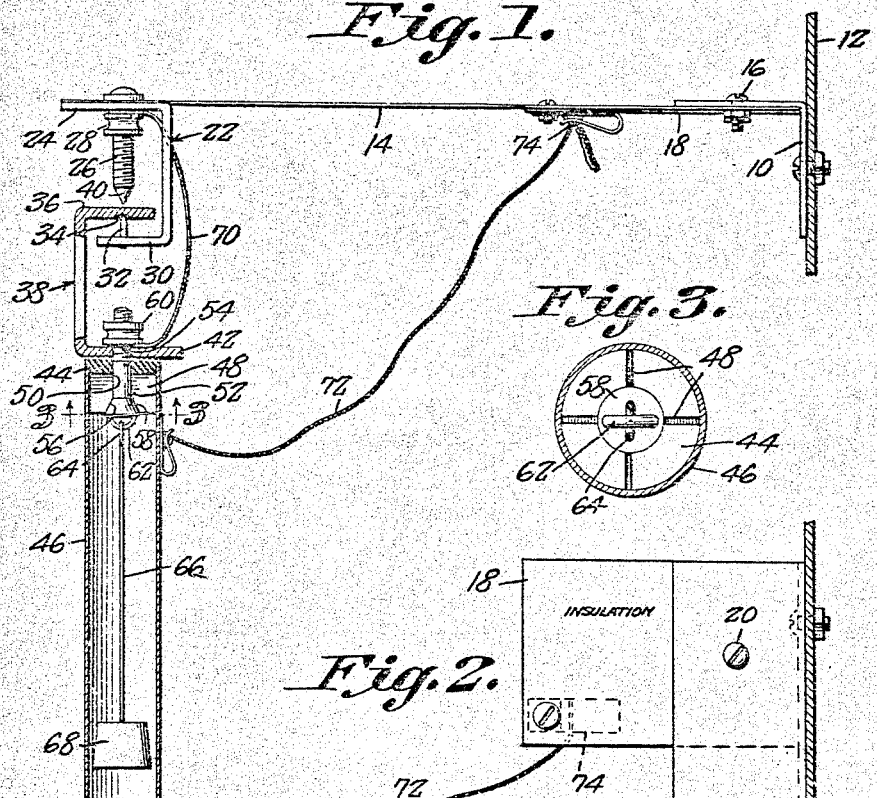
INVENTOR,
William A. Shanklin
BY
Victor J. Evans & Co.
ATTORNEYS

UNITED STATES PATENT OFFICE 2,370,497

THEFT SIGNAL

William A. Shanklin, Harlan, Ky.

Application November 14, 1942, Serial No. 465,612

2 Claims. (Cl. 200—52)

My invention relates to automotive vehicles, and has among its objects and advantages the provision of an improved theft alarm set in operation through vibration incident to unauthorized tampering with the vehicle.

In the accompanying drawing:

Figure 1 is a side view partly in section.

Figure 2 is a top view.

Figure 3 is an enlarged sectional view along the line 3—3 of Figure 1.

Figure 4 is a diagrammatic view of the electric circuit, and

Figure 5 is a side view of a modified form of the invention partly in section.

In the embodiment of the invention selected for illustration, I make use of an angle bracket 10 having one flange thereof bolted to a support 12 on the vehicle. The second flange extends horizontally from the support to serve as a mount for a thin, flexible strap 14 attached at one end to the flange by a bolt 16. A strip 18 of insulative material is also attached to this flange by a screw 20.

A U-shaped bracket 22 has its leg 24 clamped against the bottom face of the strap 14 by a bolt 26 and a nut 28. To the leg 30 of the bracket 22 is attached an upstanding pivot pin 32 having a sharpened end bearing against the face of a recess 34 in the bottom face of a leg 36 of a second U-shaped bracket 38. The end of the bolt 26 is pointed, as at 40, and slightly spaced from the leg 36 in axial alignment with the pin 32. Sufficient clearance is provided between the end 40 and the leg 36 to permit the bracket 38 to swing freely on the pivot pin, but the pointed end holds the pivot pin in the recess 34.

To the leg 42 of the bracket 38 is clamped a plug 44 of insulative material, which plug supports a depending contact tube 46. This plug is cross slotted at 48 and provided with an axial bore 50 for the reception of a bolt 52 extending through an opening 54 in the leg 42. The axial bore 50 has a flare 56, and the bolt 52 has a tapered head 58. A nut 60 on the bolt 52 engages the leg 42 to draw the plug 44 firmly against the leg 42 and causes the slotted portion of the plug to be spread against the inner face of the tube 46 to secure the tube against accidental detachment from the plug.

A loop 62 is welded to the head 58 to support an eye 64 at the upper end of a conductor wire 66 having a weight 68 attached to its lower end. This weight is of slightly smaller diameter than the inside diameter of the tube 46, but swings against the tube when the bracket 38 pivots on the pin 32 through any vibration imparted to the strap 14, as when the vehicle is moved or caused to vibrate.

A conductor wire 70 electrically connects the bolt 52 with the bolt 26, the latter being grounded to the vehicle. A conductor wire 72 has one end electrically connected with the tube 46 and its other end attached to a clip 74. In Figure 4, a wire 76 connects with the horn circuit 78 grounded at 80. This circuit includes the usual horn 82 and source of current 84, in addition to the horn switch 86. A switch 88 is interposed in the wire 76 which, when open, permits the horn 82 to be energized independently of the theft signal in the usual manner.

In operation, the switch 88 is closed when the vehicle is parked. Any vibration or movement imparted to the vehicle causes the tube 46 to oscillate and bring the weight 68 into contact with the tube 46 to close the circuit through the horn. The alarm is sensitive to slight vibration of the vehicle.

Figure 5 illustrates a modification wherein the tube structure 90 is suspended from the upper end of a highly flexible cone spring 92 in lieu of the strap 14.

Without further elaboration, the foregoing will so fully explain my invention, that others may, by applying current knowledge, readily adapt the same for use under various conditions of service.

I claim:

1. A switch of the character set forth, comprising a metal strap, means for attaching the strap at one end to a support with the strap occupying a substantially horizontal position, a bracket secured to and depending from the other end of the strap and provided at its lower end with a horizontal arm carrying an upstanding pivot pin, a second bracket having a horizontal arm arranged with its arm resting upon the pivot pin, a bolt extending downwardly from the strap with its lower end arranged in closely spaced relation to the upper side of the arm of said second bracket, a contact tube depending from the bracket, means insulating the contact tube from the second bracket, a bolt connecting the contact tube to the second bracket and passing through the insulating means and electrically connected to the strap, a conductor within the contact tube having its upper end connected to said second bolt, and a metal weight within the contact tube secured to the lower end of the conductor and normally spaced from the contact tube.

2. A switch of the character set forth, comprising an elongated metal flexible strap disposed in a substantially horizontal position, a support at one end of the strap, a substantially U-shaped bracket carried by the other end of the strap and depending therefrom, an upstanding pivot pin having a sharpened free end attached to the lower arm of the bracket, a second substantially U-shaped bracket having its upper arm resting on the pivot pin, a bolt extending downwardly from the lower arm of the second bracket, a contact tube depending from the second bracket, means insulating the contact tube from the bracket, a bolt connecting the contact tube to the second bracket and passing through the insulating means and electrically connected to the strap, a swingable mounted weighted conductor wire in the contact tube and connected with the second bolt and normally spaced from the tube but movable thereagainst to effect contact.

WILLIAM A. SHANKLIN.